US012731575B2

(12) United States Patent
Sainath et al.

(10) Patent No.: US 12,731,575 B2
(45) Date of Patent: Sep. 8, 2026

(54) ATTENTION-BASED JOINT ACOUSTIC AND TEXT ON-DEVICE END-TO-END MODEL

(71) Applicant: Google LLC, Mountain View, CA (US)

(72) Inventors: Tara N. Sainath, Jersey City, NJ (US); Ruoming Pang, New York, NY (US); Ron Weiss, New York, NY (US); Yanzhang He, Mountain View, CA (US); Chung-cheng Chiu, Sunnyvale, CA (US); Trevor Strohman, Mountain View, CA (US)

(73) Assignee: Google LLC, Mountain View, CA (US)

(*) Notice: Subject to any disclaimer, the term of this patent is extended or adjusted under 35 U.S.C. 154(b) by 560 days.

(21) Appl. No.: 18/167,454

(22) Filed: Feb. 10, 2023

(65) Prior Publication Data

US 2023/0186901 A1 Jun. 15, 2023

Related U.S. Application Data

(63) Continuation of application No. 17/155,010, filed on Jan. 21, 2021, now Pat. No. 11,594,212.

(Continued)

(51) Int. Cl.

| | |
|---|---|
| ***G10L 15/06*** | (2013.01) |
| ***G06N 3/08*** | (2023.01) |

(Continued)

(52) U.S. Cl.

CPC .............. *G10L 15/063* (2013.01); *G06N 3/08* (2013.01); *G10L 15/16* (2013.01); *G10L 15/197* (2013.01); *G10L 2015/0635* (2013.01)

(58) Field of Classification Search

CPC ..... G10L 15/063; G10L 15/16; G10L 15/197; G10L 2015/0635; G06N 3/08

See application file for complete search history.

(56) References Cited

U.S. PATENT DOCUMENTS

| | | | | |
|---|---|---|---|---|
| 9,799,327 | B1 | 10/2017 | Chan et al. | |
| 10,867,595 | B2 * | 12/2020 | Sriram | G10L 15/063 |

(Continued)

FOREIGN PATENT DOCUMENTS

| | | |
|---|---|---|
| WO | 2018168509 A1 | 9/2018 |
| WO | 2019116606 A1 | 6/2019 |

OTHER PUBLICATIONS

Takaaki Hori et. al.,Cycle-consistency Training for End-to-end Speech Recognition,2019 IEEE International Conference on Acoustics, Speech and Signal Processing (ICASSP),May 17, 2019,https://ieeexplore.ieee.org/stamp/stamp.jsp?tp=&arnumber=8683307, 5 pages.

*Primary Examiner* — Bhavesh M Mehta
*Assistant Examiner* — Nandini Subramani
(74) *Attorney, Agent, or Firm* — Honigman LLP; Brett A. Krueger; Grant Griffith

(57) ABSTRACT

A method includes receiving a training example for a listen-attend-spell (LAS) decoder of a two-pass streaming neural network model and determining whether the training example corresponds to a supervised audio-text pair or an unpaired text sequence. When the training example corresponds to an unpaired text sequence, the method also includes determining a cross entropy loss based on a log probability associated with a context vector of the training example. The method also includes updating the LAS decoder and the context vector based on the determined cross entropy loss.

20 Claims, 7 Drawing Sheets

Related U.S. Application Data

(60) Provisional application No. 62/964,567, filed on Jan. 22, 2020.

(51) Int. Cl.

| | |
|---|---|
| ***G10L 15/16*** | (2006.01) |
| ***G10L 15/197*** | (2013.01) |

(56) References Cited

U.S. PATENT DOCUMENTS

| | | | | |
|---|---|---|---|---|
| 11,017,761 | B2 * | 5/2021 | Peng | G10L 25/30 |
| 11,107,463 | B2 * | 8/2021 | Prabhavalkar | G10L 15/16 |
| 11,657,799 | B2 * | 5/2023 | Zhao | G10L 15/063<br>704/232 |
| 11,929,060 | B2 * | 3/2024 | Chen | G06N 3/044 |
| 12,051,407 | B2 * | 7/2024 | Prabhavalkar | G06N 3/044 |
| 2018/0261225 | A1 * | 9/2018 | Watanabe | G10L 15/28 |
| 2018/0330718 | A1 * | 11/2018 | Hori | G06N 3/08 |
| 2019/0057683 | A1 | 2/2019 | Sak et al. | |
| 2019/0130903 | A1 | 5/2019 | Sriram et al. | |
| 2019/0189111 | A1 | 6/2019 | Watanabe et al. | |
| 2021/0225369 | A1 * | 7/2021 | Hu | G06N 3/044 |
| 2022/0310072 | A1 * | 9/2022 | Sainath | G10L 15/16 |
| 2023/0186901 | A1 * | 6/2023 | Sainath | G10L 15/063<br>704/232 |

* cited by examiner

ATTENTION-BASED JOINT ACOUSTIC AND TEXT ON-DEVICE END-TO-END MODEL

CROSS-REFERENCE TO RELATED APPLICATIONS

This U.S. patent application is a continuation of, and claims priority under 35 U.S.C. § 120 from, U.S. patent application Ser. No. 17/155,010, filed on Jan. 21, 2021, which claims priority under 35 U.S.C. § 119(e) to U.S. Provisional Application 62/964,567, filed on Jan. 22, 2020. The disclosures of these prior applications are considered part of the disclosure of this application and are hereby incorporated by reference in their entireties.

TECHNICAL FIELD

This disclosure relates to two-pass end-to-end speech recognition.

BACKGROUND

Modern automated speech recognition (ASR) systems focus on providing not only high quality (e.g., a low word error rate (WER)), but also low latency (e.g., a short delay between the user speaking and a transcription appearing). Moreover, when using an ASR system today there is a demand that the ASR system decode utterances in a streaming fashion that corresponds to real-time or even faster than real-time. To illustrate, when an ASR system is deployed on a mobile phone that experiences direct user interactivity, an application on the mobile phone using the ASR system may require the speech recognition to be streaming such that words appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience.

SUMMARY

One aspect of the present disclosure provides a computer-implemented method that when executed on data processing hardware causes the data processing hardware to perform operations that include receiving a training example for a listen-attend-spell (LAS) decoder of a two-pass streaming neural network model and determining whether the training example corresponds to a supervised audio-text pair or an unpaired text sequence. When the training example corresponds to an unpaired text sequence, the operations also include determining a cross entropy loss based on a log probability associated with a context vector of the training example, and updating the LAS decoder and the context vector based on the determined cross entropy loss.

Implementations of the disclosure may include one or more of the following optional features. In some implementations, the operations also include receiving a second training example for the LAS decoder of the two-pass streaming neural network, determining that the second training example corresponds to the supervised audio-text pair, and updating the LAS decoder and acoustic context vector parameters associated with an acoustic context vector based on a log probability for the acoustic context vector. In some examples, determining whether the training example corresponds to the supervised audio-text pair or the unpaired text sequence includes identifying a domain identifier that indicates whether the training example corresponds to the supervised audio-text pair or the unpaired text sequence.

In additional implementations, updating the LAS decoder reduces a word error rate (WER) of the two-pass streaming neural network model with respect to long tail entities. The log probability may be defined by an interpolation of a first respective log probability generated from an acoustic context vector and a second respective log probability generated from a text context vector. Furthermore, the LAS decoder may operate in a beam search mode based on a hypothesis generated by a recurrent neural network transducer (RNN-T) decoder during a first pass of the two-pass streaming neural network model. In some examples, the operations also include generating the context vector of the training example with an attention mechanism configured to summarize encoder features from an encoded acoustic frame.

Another aspect of the present disclosure provides a computer-implemented method that when executed on data processing hardware causes the data processing hardware to perform operations that include receiving a training example for a listen-attend-spell (LAS) decoder of a two-pass streaming neural network model, determining whether the training example corresponds to a supervised audio-text pair or unpaired training data, generating a missing portion of the unpaired training data to form a generated audio-text pair when the training example corresponds to the unpaired training data, and updating the LAS decoder and a context vector associated with the unpaired data based on the generated audio-text pair.

This aspect may include one or more of the following optional features. In some implementations, the operations also include determining an acoustic context vector based on the generated audio-text pair, and determining an interpolation of a first respective log probability generated from the acoustic context vector and a second respective log probability generated from a text context vector. In these implementations, updating the LAS decoder is further based on the interpolation of the first respective log probability and the second respective log probability.

In some examples, determining whether the training example corresponds to the supervised audio-text pair or the unpaired training data includes identifying a domain identifier that indicates whether the training example corresponds to the supervised audio-text pair or the unpaired training data. Additionally, updating the LAS decoder may reduce a word error rate (WER) of the two-pass streaming neural network model with respect to long tail entities. In some implementations, the operations also include generating the context vector of the training example using an attention mechanism configured to summarize encoder features from an encoded acoustic frame.

Yet another aspect of the present disclosure provides a system that includes data processing hardware and memory hardware in communication with the data processing hardware and storing instructions that when executed by the data processing hardware cause the data processing hardware to perform operations that include receiving a training example for a listen-attend-spell (LAS) decoder of a two-pass streaming neural network model and determining whether the training example corresponds to a supervised audio-text pair or an unpaired text sequence. When the training example corresponds to an unpaired text sequence, the operations also include determining a cross entropy loss based on a log probability associated with a context vector of the training example, and updating the LAS decoder and the context vector based on the determined cross entropy loss.

This aspect may include one or more of the following optional features. In some implementations, the operations also include receiving a second training example for the LAS decoder of the two-pass streaming neural network, determining that the second training example corresponds to the supervised audio-text pair, and updating the LAS decoder and acoustic context vector parameters associated with an acoustic context vector based on a log probability for the acoustic context vector. In some examples, determining whether the training example corresponds to the supervised audio-text pair or the unpaired text sequence includes identifying a domain identifier that indicates whether the training example corresponds to the supervised audio-text pair or the unpaired text sequence.

In additional implementations, updating the LAS decoder reduces a word error rate (WER) of the two-pass streaming neural network model with respect to long tail entities. The log probability may be defined by an interpolation of a first respective log probability generated from an acoustic context vector and a second respective log probability generated from a text context vector. Furthermore, the LAS decoder may operate in a beam search mode based on a hypothesis generated by a recurrent neural network transducer (RNN-T) decoder during a first pass of the two-pass streaming neural network model. In some examples, the operations also include generating the context vector of the training example with an attention mechanism configured to summarize encoder features from an encoded acoustic frame.

Yet another aspect of the present disclosure provides a system that includes data processing hardware and memory hardware in communication with the data processing hardware and storing instructions that when executed by the data processing hardware cause the data processing hardware to perform operations that include receiving a training example for a listen-attend-spell (LAS) decoder of a two-pass streaming neural network model, determining whether the training example corresponds to a supervised audio-text pair or unpaired training data, generating a missing portion of the unpaired training data to form a generated audio-text pair when the training example corresponds to the unpaired training data, and updating the LAS decoder and a context vector associated with the unpaired data based on the generated audio-text pair.

This aspect may include one or more of the following optional features. In some implementations, the operations also include determining an acoustic context vector based on the generated audio-text pair, and determining an interpolation of a first respective log probability generated from the acoustic context vector and a second respective log probability generated from a text context vector. In these implementations, updating the LAS decoder is further based on the interpolation of the first respective log probability and the second respective log probability.

In some examples, determining whether the training example corresponds to the supervised audio-text pair or the unpaired training data includes identifying a domain identifier that indicates whether the training example corresponds to the supervised audio-text pair or the unpaired training data. Additionally, updating the LAS decoder may reduce a word error rate (WER) of the two-pass streaming neural network model with respect to long tail entities. In some implementations, the operations also include generating the context vector of the training example using an attention mechanism configured to summarize encoder features from an encoded acoustic frame.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
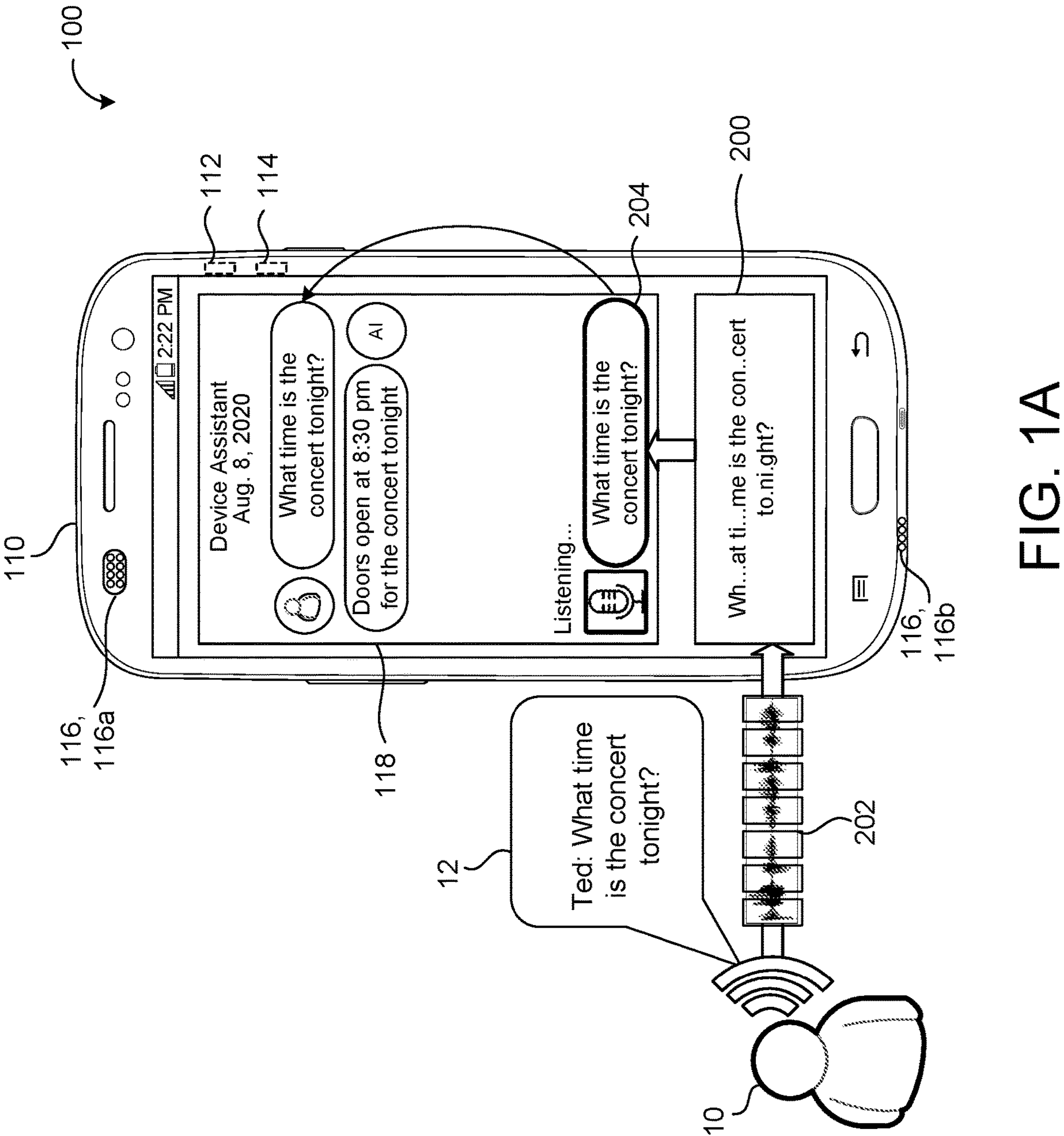
FIGS. 1A and 1B are schematic views of example speech environments using a two-pass architecture with a joint acoustic and text model.

Speech recognition continues to evolve to meet the untethered and the nimble demands of a mobile environment. New speech recognition architectures or improvements to existing architectures continue to be developed that seek to increase the quality of automatic speech recognition systems (ASR). To illustrate, speech recognition initially employed multiple models where each model had a dedicated purpose. For instance, an ASR system included an acoustic model (AM), a pronunciation model (PM), and a language model (LM). The acoustic model mapped segments of audio (i.e., frames of audio) to phonemes. The pronunciation model connected these phonemes together to form words while the language model was used to express the likelihood of given phrases (i.e., the probability of a sequence of words). Yet although these individual models worked together, each model was trained independently and often manually designed on different datasets.

The approach of separate models enabled a speech recognition system to be fairly accurate, especially when the training corpus (i.e., body of training data) for a given model caters to the effectiveness of the model, but needing to independently train separate models introduced its own complexities and led to an architecture with integrated models. These integrated models sought to use a single neural network to directly map an audio waveform (i.e., input sequence) to an output sentence (i.e., output sequence). This resulted in a sequence-to-sequence approach, which generated a sequence of words (or graphemes) when given a sequence of audio features. Examples of sequence-to-sequence models include "attention-based" models and "listen-attend-spell" (LAS) models. A LAS model transcribes speech utterances into characters using a listener component, an attender component, and a speller component. Here, the listener is a recurrent neural network (RNN) encoder that receives an audio input (e.g., a time-frequency representation of speech input) and maps the audio input to a higher-level feature representation. The attender attends to the higher-level feature to learn an alignment between input features and predicted subword units (e.g., a grapheme or a wordpiece). The speller is an attention-based RNN decoder that generates character sequences from the input by producing a probability distribution over a set of hypothesized words. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system.

Although early E2E models proved accurate and a training improvement over individually trained models, these E2E models, such as the LAS model, functioned by reviewing an entire input sequence before generating output text, and thus, did not allow streaming outputs as inputs were received. Without streaming capabilities, an LAS model is unable to perform real-time voice transcription. Due to this deficiency, deploying the LAS model for speech applications that are latency sensitive and/or require real-time voice transcription may pose issues. This makes an LAS model alone not an ideal model for mobile technology (e.g., mobile phones) that often relies on real-time applications (e.g., real-time communication applications).

Additionally, speech recognition systems that have acoustic, pronunciation, and language models, or such models composed together, may rely on a decoder that has to search a relatively large search graph associated with these models. With a large search graph, it is not conducive to host this type of speech recognition system entirely on-device. Here, when a speech recognition system is hosted "on-device," a device that receives the audio input uses its processor(s) to execute the functionality of the speech recognition system. For instance, when a speech recognition system is hosted entirely on-device, the processors of the device do not need to coordinate with any off-device computing resources to perform the functionality of the speech recognition system. A device that performs speech recognition not entirely on-device relies on remote computing (e.g., of a remote computing system or cloud computing) and therefore online connectivity to perform at least some function of the speech recognition system. For example, a speech recognition system performs decoding with a large search graph using a network connection with a server-based model.

Unfortunately, being reliant upon a remote connection makes a speech recognition system vulnerable to latency issues and/or inherent unreliability of communication networks. To improve the usefulness of speech recognition by avoiding these issues, speech recognition systems again evolved into a form of a sequence-to-sequence model known as a recurrent neural network transducer (RNN-T). A RNN-T does not employ an attention mechanism and, unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters one-by-one as spoken. Here, an RNN-T uses a feedback loop that feeds symbols predicted by the model back into itself to predict the next symbols. Because decoding the RNN-T includes a beam search through a single neural network instead of a large decoder graph, an RNN-T may scale to a fraction of the size of a server-based speech recognition model. With the size reduction, the RNN-T may be deployed entirely on-device and be able to run offline (i.e., without a network connection); therefore, avoiding unreliability issues with communication networks.

In addition to speech recognition systems operating with low latency, a speech recognition system also needs to be accurate at recognizing speech. Often for models that perform speech recognition, a metric that may define an accuracy of a model is a word error rate (WER). A WER refers to a measure of how many words are changed compared to a number of words actually spoken. Commonly, these word changes refer to substitutions (i.e., when a word gets replaced), insertions (i.e., when a word is added), and/or deletions (i.e., when a word is omitted). To illustrate, a speaker says "car," but an ASR system transcribes the word "car" as "bar." This is an example of a substitution due to phonetic similarity. When measuring the capability of an ASR system compared to other ASR systems, the WER may indicate some measure of improvement or quality capability relative to another system or some baseline.

Although an RNN-T model showed promise as a strong candidate model for on-device speech recognition, the RNN-T model alone still lags behind a large state-of-the-art conventional model (e.g., a server-based model with separate AM, PM, and LMs) in terms of quality (e.g., speech recognition accuracy). Yet a non-streaming E2E, LAS model has speech recognition quality that is comparable to large state-of-the-art conventional models. To capitalize on the quality of a non-steaming E2E LAS model, a two-pass speech recognition system (e.g., shown in FIG. 2A) was developed that includes a first-pass component of an RNN-T network followed by a second-pass component of a LAS network. With this design, the two-pass model benefits from the streaming nature of an RNN-T model with low latency while improving the accuracy of the RNN-T model through the second-pass incorporating the LAS network. Although the LAS network increases the latency when compared to only a RNN-T model, the increase in latency is reasonably slight and complies with latency constraints for on-device operation. With respect to accuracy, a two-pass model achieves a 17-22% WER reduction when compared to a RNN-T alone and has a similar WER when compared to a large conventional model.

Unfortunately, this two-pass model with an RNN-T network first pass and a LAS network second pass has some deficiencies. For instance, this type of two-pass model suffers from being trained only on supervised audio-text pairs. With training only on supervised audio-text pairs, the two-pass model performs poorly on rare words or long tail entities. Long tail entities refer to a large number of entities with relatively few instances (i.e., low frequency) in a text corpora. In other words, rare words that are uncommon are therefore also inherently uncommon in smaller training data sets. When training a streaming E2E model, such as the two-pass model, the training occurs using a training set for a conventional acoustic model (AM) that is a small fraction of the size of the text data used to train a conventional language model (LM). Although there have been techniques proposed to improve a two-pass model's performance on rare words, many of the proposed techniques significantly increase model size (e.g., incorporating a recurrent neural network language model (RNN-LM) into the speech recognition system), training time (e.g., training with unsupervised audio-text pairs), and/or inference cost.

To increase a two-pass model's effectiveness on rare words, implementations herein are directed toward incorporating a joint acoustic and text decoder (JATD) into the two-pass model architecture. The JATD functions provides a domain identifier (ID) indicating whether a training example corresponds to a supervised audio-text pair or an audio-text example generated from unpaired data (e.g., a text only sample or an audio only sample). For unpaired data, the missing half of the pair may be synthesized using a text-to-speech (TTS) system to generate a missing audio portion or an ASR system to generate a missing text portion. During training, the encoder generates an acoustic context vector to be fed into the decoder when the encoder receives a paired example. Here, the successful generation of the acoustic context vector represents or forms a domain ID that indicates paired data. On the other hand, when the decoder encounters an unpaired example, a fixed, but learnable, context vector domain ID is used to bypass the encoder network. Both of these examples are then used for training at the decoder; allowing the decoder to be trained simultaneously on both paired and unpaired data without increasing the model size. Moreover, instead of an approach that shares attention and decoder parameters across all modes that only changes the parameters of an input to an encoder based on the input source, this JATD approach only shares decoder parameters and uses different attention context parameters. On a variety of proper noun and rare-word test sets, the JATD model has achieved a 3-10% relative reduction in WER when compared to a two-pass architecture trained only on paired data.

Figure 1B:
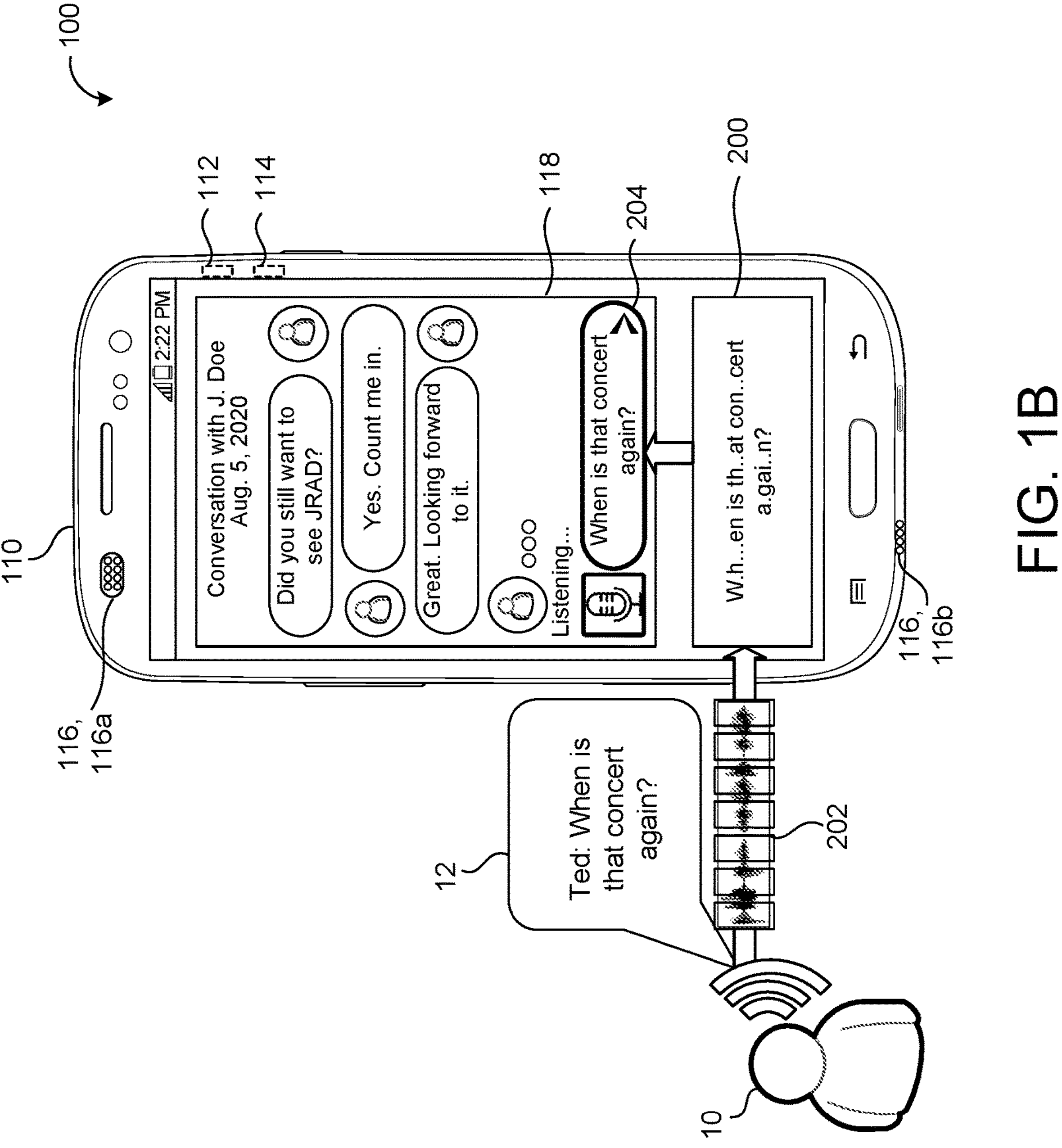

FIGS. 1A and 1B are examples of a speech environment 100. In the speech environment 100 a user's 10 manner of interacting with a computing device, such as a user device 110, may be through voice input. The user device 110 (also referred to generally as a device 110) is configured to capture sounds (e.g., streaming audio data) from one or more users 10 within the speech-enabled environment 100. Here, the streaming audio data 12 may refer to a spoken utterance by the user 10 that functions as an audible query, a command for the device 110, or an audible communication captured by the device 110. Speech-enabled systems of the device 110 may field the query or the command by answering the query and/or causing the command to be performed.

The user device 110 may correspond to any computing device associated with a user 10 and capable of receiving audio data 12. Some examples of user devices 110 include, but are not limited to, mobile devices (e.g., mobile phones, tablets, laptops, etc.), computers, wearable devices (e.g., smart watches), smart appliances, internet of things (IoT) devices, smart speakers, etc. The user device 110 includes data processing hardware 112 and memory hardware 114 in communication with the data processing hardware 112 and storing instructions, that when executed by the data processing hardware 112, cause the data processing hardware 112 to perform one or more operations. The user device 110 further includes an audio subsystem 116 with an audio capture device (e.g., microphone) 116, 116*a* for capturing and converting spoken utterances 12 within the speech-enabled system 100 into electrical signals and a speech output device (e.g., a speaker) 116, 116*b* for communicating an audible audio signal (e.g., as output audio data from the device 110). While the user device 110 implements a single audio capture device 116*a* in the example shown, the user device 110 may implement an array of audio capture devices 116*a* without departing from the scope of the present disclosure, whereby one or more capture devices 116*a* in the array may not physically reside on the user device 110, but be in communication with the audio subsystem 116. The user device 110 (e.g., using the hardware 112, 114) is further configured to perform speech recognition processing on the streaming audio data 12 using a speech recognizer 200. In some examples, the audio subsystem 116 of the user device 110 that includes the audio capture device 116*a* is configured to receive audio data 12 (e.g., spoken utterances) and to convert the audio data 12 into a digital format compatible with the speech recognizer 200. The digital format may correspond to acoustic frames (e.g., parameterized acoustic frames), such as mel frames. For instance, the parameterized acoustic frames correspond to log-mel filterbank energies.

In some examples, such as FIG. 1A, the user 10 interacts with a program or application 118 of the user device 110 that uses the speech recognizer 200. For instance, FIG. 1A depicts the user 10 communicating with an automated assistant application. In this example, the user 10 asks the automated assistant, "What time is the concert tonight?" This question from the user 10 is a spoken utterance 12 captured by the audio capture device 116*a* and processed by audio subsystems 116 of the user device 110. In this example, the speech recognizer 200 of the user device 110 receives the audio input 202 (e.g., as acoustic frames) of "what time is the concert tonight" and transcribes the audio input 202 into a transcription 204 (e.g., a text representation of "what time is the concert tonight?"). Here, the automated assistant of the application 118 may respond to the question posed by the user 10 using natural language processing. Natural language processing generally refers to a process of interpreting written language (e.g., the transcription 204) and determining whether the written language prompts any action. In this example, the automated assistant uses natural language processing to recognize that the question from the user 10 regards the user's schedule and more particularly a concert on the user's schedule. By recognizing these details with natural language processing, the automated assistant returns a response to the user's query where the response states, "Doors open at 8:30 pm for the concert tonight." In some configurations, natural language processing may occur on a remote system in communication with the data processing hardware 112 of the user device 110.

FIG. 1B is another example of speech recognition with the speech recognizer 200. In this example, the user 10 associated with the user device 110 is communicating with a friend named Jane Doe with a communication application 118. Here, the user 10 named Ted, communicates with Jane by having the speech recognizer 200 transcribe his voice inputs. The audio capture device 116 captures these voice inputs and communicates them in a digital form (e.g., acoustic frames) to the speech recognizer 200. The speech recognizer 200 transcribes these acoustic frames into text that is sent to Jane via the communication application 118. Because this type of application 118 communicates via text, the transcription 204 from the speech recognizer 200 may be sent to Jane without further processing (e.g., natural language processing).

Figure 2A:
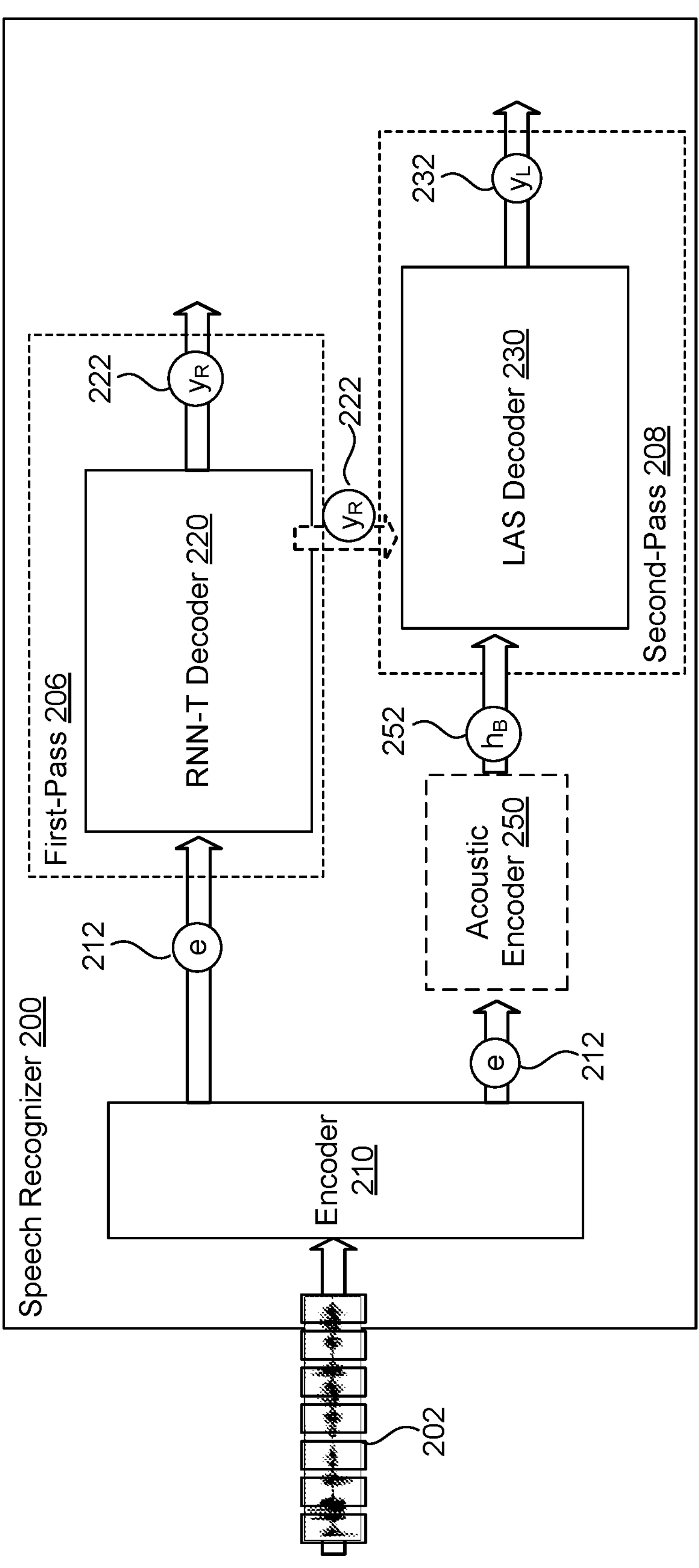
FIG. 2A is a schematic view of an example traditional two-pass architecture for speech recognition.
Figure 2B:
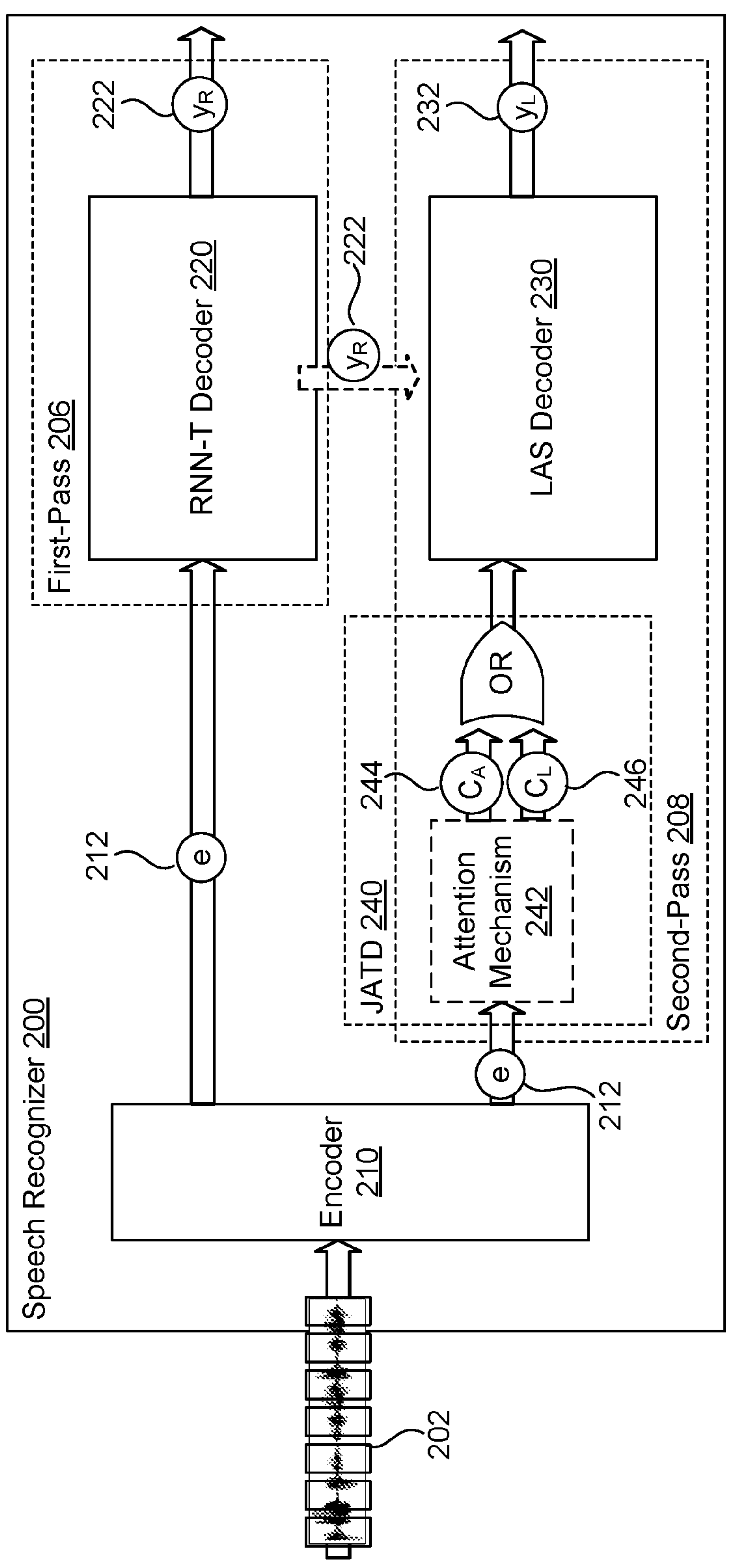
FIG. 2B is a schematic view of an example joint acoustic and text model incorporated into the two-pass architecture of FIG. 2A for speech recognition.

In some examples, such as FIGS. 2A and 2B, the speech recognizer 200 is configured in a two-pass architecture. Generally speaking, the two-pass architecture of the speech recognizer 200 includes at least one shared encoder 210, an RNN-T decoder 220, and a LAS decoder 230. Here, FIG. 2A depicts a traditional two-pass architecture while FIG. 2B depicts an enhanced two-pass architecture that incorporates a JATD model 240. As can be seen in these figures, the enhanced two-pass architecture of FIG. 2B builds on the fundamental two-pass structure of FIG. 2A. In two-pass decoding, the second pass 208 (e.g., shown as the LAS decoder 230) may improve the initial outputs from the first pass 206 (e.g., shown as the RNN-T decoder 220) with techniques such as lattice rescoring or n-best re-ranking. In other words, the RNN-T decoder 220 produces streaming predictions and the LAS decoder 230 finalizes the prediction. Here, specifically, the LAS decoder 230 rescores streamed hypotheses $y_R$ 222 from the RNN-T decoder 220. Although it is generally discussed that the LAS decoder 230 functions in a rescoring mode that rescores streamed hypotheses $y_R$ 222 from the RNN-T decoder 220, the LAS decoder 230 is also capable of operating in different modes, such as a beam search mode, depending on design or other factors (e.g., utterance length).

The at least one encoder 210 is configured to receive, as an audio input 202, acoustic frames corresponding to streaming audio data 12. The acoustic frames may be previously processed by the audio subsystem 116 into parameterized acoustic frames (e.g., mel frames and/or spectral frames). In some implementations, the parameterized acoustic frames correspond to log-mel filterbank energies with log-mel features. For instance, the parameterized input acoustic frames that are output by the audio subsystem 116 and that are input into the encoder 210 may be represented as $x=(x_1, \ldots, x_T)$, where $x_t \in \mathbb{R}^d$ are log-mel filterbank energies, T denotes the number of frames in x, and d represents the number of log-Mel features. In some examples, each parameterized acoustic frame includes 128-dimensional log-mel features computed within a short shifting window (e.g., 32 milliseconds and shifted every 10 milliseconds). Each feature may be stacked with previous frames (e.g., three previous frames) to form a higher-dimensional vector (e.g., a 512-dimensional vector using the three previous frames). The features forming the vector may then be downsampled (e.g., to a 30 millisecond frame rate). Based on the audio input 202, the encoder 210 is configured to generate an encoding e. For example, the encoder 210 generates encoded acoustic frames (e.g., encoded mel frames or acoustic embeddings).

Although the structure of the encoder 210 may be implemented in different ways, in some implementations, the encoder 210 is a long-short term memory (LSTM) neural network. For instance, the encoder 210 includes eight LSTM layers. Here, each layer may have 2,048 hidden units followed by a 640-dimensional projection layer. In some examples, a time-reduction layer is inserted with the reduction factor N=2 after the second LSTM layer of encoder 210.

In some configurations, the encoder 210 is a shared encoder network. In other words, instead of each pass network 206, 208 having its own separate encoder, each pass 206, 208 shares a single encoder 210. By sharing an encoder, an ASR speech recognizer 200 that uses a two-pass architecture may reduce its model size and/or its computational cost. Here, a reduction in model size may help enable the speech recognizer 200 to function well entirely on-device.

In some examples, the speech recognizer 200 of FIG. 2A also includes an additional encoder, such as the acoustic encoder 250, to adapt the encoder 210 output 212 to be suitable for the second pass 208 of the LAS decoder 230. The acoustic encoder 250 is configured to further encode the output 212 into an encoded output 252. In some implementations, the acoustic encoder 250 is a LSTM encoder (e.g., a two-layer LSTM encoder) that further encodes the output 212 from the encoder 210. By including an additional encoder, the encoder 210 may still be preserved as a shared encoder between passes 206, 208.

During the first pass 206, the encoder 210 receives each acoustic frame of the audio input 202 and generates an output 212 (e.g., shown as the encoding e of the acoustic frame). The RNN-T decoder 220 receives the output 212 for each frame and generates an output 222, shown as the hypothesis $y_R$, at each time step in a streaming fashion. In some implementations, the RNN-T decoder 220 includes a prediction network and a joint network. Here, the prediction network may have two LSTM layers of 2,048 hidden units and a 640-dimensional projection per layer as well as an embedding layer of 128 units. The outputs 212 of the encoder 210 and the prediction network may be fed into the joint network that includes a softmax predicting layer. In some examples, the joint network of the RNN-T decoder 220 includes 640 hidden units followed by a softmax layer that predicts 4,096 mixed-case word pieces.

In the two-pass model of FIG. 2A, during the second pass 208, the LAS decoder 230 receives the output 212 (or encoded output 252) from the encoder 210 for each frame and generates an output 232 designated as the hypothesis $y_L$. When the LAS decoder 230 operates in a beam search mode, the LAS decoder 230 produces the output 232 from the output 212 (or output 252) alone; ignoring the output 222 of the RNN-T decoder 220. When the LAS decoder 230 operates in the rescoring mode, the LAS decoder 230 obtains the top-K hypotheses from the RNN-T decoder 220 and then the LAS decoder 230 is run on each sequence in a teacher-forcing mode, with attention on the output 212 (or output 252), to compute a score. For example, a score combines a log probability of the sequence and an attention coverage penalty. The LAS decoder 230 selects a sequence with the highest score to be the output 232. Here, in the rescoring mode, the LAS decoder 230 may include multi-headed attention (e.g., with four heads) to attend to the output 212 (or the output 252). Furthermore, the LAS decoder 230 may be a two-layer LAS decoder 230 with a softmax layer for prediction. For instance, each layer of the LAS decoder 230 has 2,048 hidden units followed by a 640-dimensional projection. The softmax layer may include 4,096 dimensions to predict the same mixed-case word pieces from the softmax layer of the RNN-T decoder 220.

In some implementations, training the two-pass model of FIG. 2A occurs in two stages. During the first stage, the encoder 210 and the RNN-T decoder 220 are trained to maximize $\hat{P}(y_R=y|x)$. In the second stage, the encoder 210 is fixed and the LAS decoder 230 is trained to maximize $\hat{P}(y_L=y|x)$. When the two-pass model includes the additional encoder 250, the additional encoder 250 trains to maximize $\hat{P}(y_L=y|x)$ in the second stage while the encoder 210 is fixed.

Referring to FIG. 2B, the first pass 206 remains the same, but the second pass 208 uses a JATD model 240 that includes an attention mechanism 242 prior to decoding at the LAS decoder 230. Here, the attention mechanism 242 receives the encoded output 212 (or output 252) and determines a context vector c, $c_A$, $c_L$ that summarizes the encoded features for each output step. The attention mechanism 242 is configured to change the context vector c passed to the LAS decoder 230 depending on the type of input training data. In other words, the attention mechanism 242 generates an acoustic context vector 244, $c_A$ when the input training data (i.e., a particular training example) is a supervised audio-text pair and a fixed linguistic context vector 246, $c_L$ when the input training data is an unpaired text sequence. With the JATD model 240 integrated with the LAS decoder 230, the JATD model 240 changes both inference and training of the LAS decoder 230 to utilize paired and/or unpaired data.

During inference, the LAS decoder 230 computes log probabilities based on the equation below. For instance, with an acoustic input, the acoustic context vector $c_a$ determines the log probabilities for the LAS decoder 230 at each decoder step u. Here, $y_{u-1:1}=\{y_{u-1}, \ldots, y_1\}$ indicates previously decoded labels of a single hypothesis during inference. Similarly, with a text-based input, the linguistic context vector $c_L$ determines the log probabilities for the LAS decoder 230 at each decoder step. In both of these situations, the log probability predicts labels based on previous labels alone such that audio features are ignored completely. In other words, by generating log probabilities from either an acoustic or linguistic context vector c, the probabilities generally indicate an acoustic score and/or a linguistic score. Therefore, each decoder time step may be represented as the interpolation of the acoustic-based log probabilities and the linguistic-based log probabilities using a mixing weight λ (e.g., where the mixed weight corresponds to the ratio of acoustic samples to linguistic samples). In some examples, this inference applies when the LAS decoder 230 operates in a rescore mode or a beam search mode. Based on iterations with various sources of data and test sets, a mixing weight around 0.05 may be optimal for inference.

$$\lambda \log p(y_u|x,c_a,y_{u-1:1})+(1-\lambda)\log p(y_u|c_L,y_{u-1:1}) \quad (1)$$

During training, the RNN-T decoder 220 trains the same way as the traditional two-pass architecture. In other words, the RNN-T decoder 220 trains with supervised audio-text paired data. Yet when training the LAS decoder 230, more than one training strategy may be used. For instance, a first training strategy is an individual training strategy while a second training strategy is a joint training strategy. In the individual training strategy, when an audio-text pair is used, the LAS decoder 230 updates based on the determination of equation (2a) using the acoustic context vector $c_a$, 244. Here, in addition to the LAS decoder 230 updating, the solution to equation (2a) updates acoustic context vector parameters. On the other hand, when unpaired data is used, the training loss reduces to the cross entropy loss computed from equation (2b) where $c_L$ a trainable context vector. In this situation, only the LAS decoder 230 and the context vector update.

$$\mathcal{L} = \begin{cases} \log p(y_u \mid x, c_a, y_{u-1:1}), & (2a) \\ \log p(y_u \mid c_L, y_{u-1:1}) & (2b) \end{cases}$$

Using the joint training strategy, in some implementations, the interpolation of log probabilities generated from the acoustic and linguistic context vectors 244, 246 define the training loss in a similar manner to inference. Here, supervised audio data is represented as $x^a$. In examples that include supervised audio-text pairs, the LAS decoder 230 and the acoustic attention parameters update based on the interpolation of $\log p(y_u|x, c_a, y_{u-1:1})$ and $\log p(y_u|c_L, y_{u-1:1})$. For unpaired data, there is a lack of an acoustic context vector $c_a$ to determine the appropriate log probabilities. When this occurs, there are two potential options. First, a conventional model may generate hypothesized text (e.g., a text transcription) after obtaining real audio. Here, using transcribed audio is similar to model distillation. In a second approach, the first approach may be reversed such that a system like TTS synthesizes an acoustic signal from real text. Using these approaches, the unpaired data no longer lacks an acoustic context vector $c_a$. Therefore, with a resolved acoustic context vector $c_a$, the speech recognizer 200 may interpolate the log probabilities for the unpaired data. Based on this interpolation, the speech recognizer 200 updates the LAS decoder 230 and the fixed context vector parameters. In some implementations, the speech recognizer 200 adjusts the mixing weight λ to avoid biasing the acoustic attention parameters of the attention mechanism 242.

$$\mathcal{L} = \begin{cases} \lambda \log p(y_u \mid x^a, c_a, y_{u-1:1}) + (1-\lambda)\log p(y_u \mid c_L, y_{u-1:1}), & (3a) \\ \lambda \log p(y_u \mid x^l, c_a, y_{u-1:1}) + (1-\lambda)\log p(y_u \mid c_L, y_{u-1:1}) & (3b) \end{cases}$$

Figure 3:
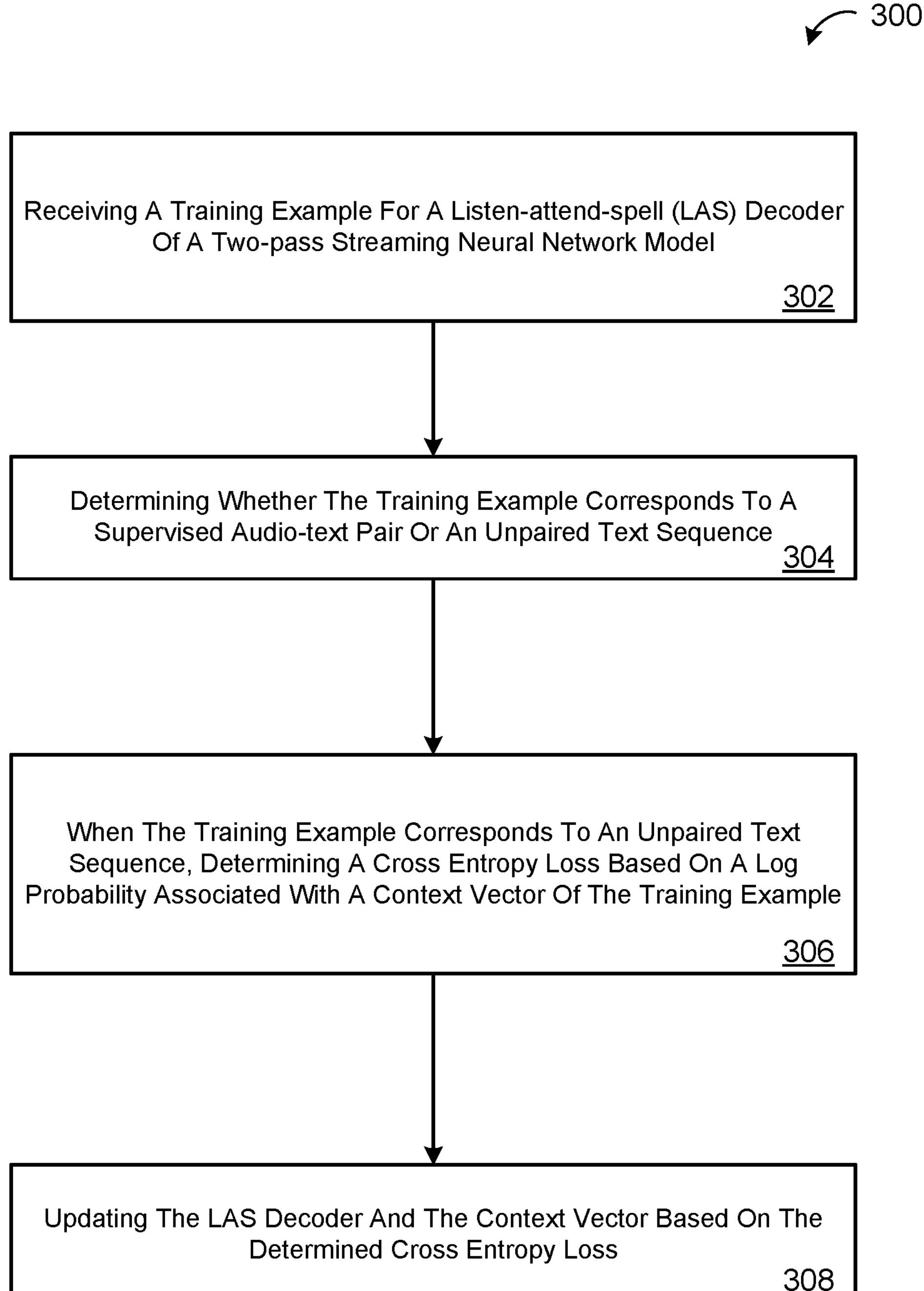
FIG. 3 is a flowchart of an example arrangement of operations for a method of implementing the two-pass architecture of FIG. 2B incorporating the joint acoustic and text model.

FIG. 3 is a flowchart of an example arrangement of operations for a method 300 of performing automated speech recognition (e.g., ASR). At operation 302, the method 300 receives a training example for a LAS decoder 230 of a two-pass streaming neural network model. At operation 304, the method 300 determines whether the training example corresponds to a supervised audio-text pair or an unpaired text sequence. When the training example corresponds to an unpaired text sequence, at operation 306, the method 300 determines a cross entropy loss based on a log probability associated with a context vector c of the training example. At operation 308, the method 300 updates the LAS decoder 230 and the context vector c based on the determined cross entropy loss.

Figure 4:
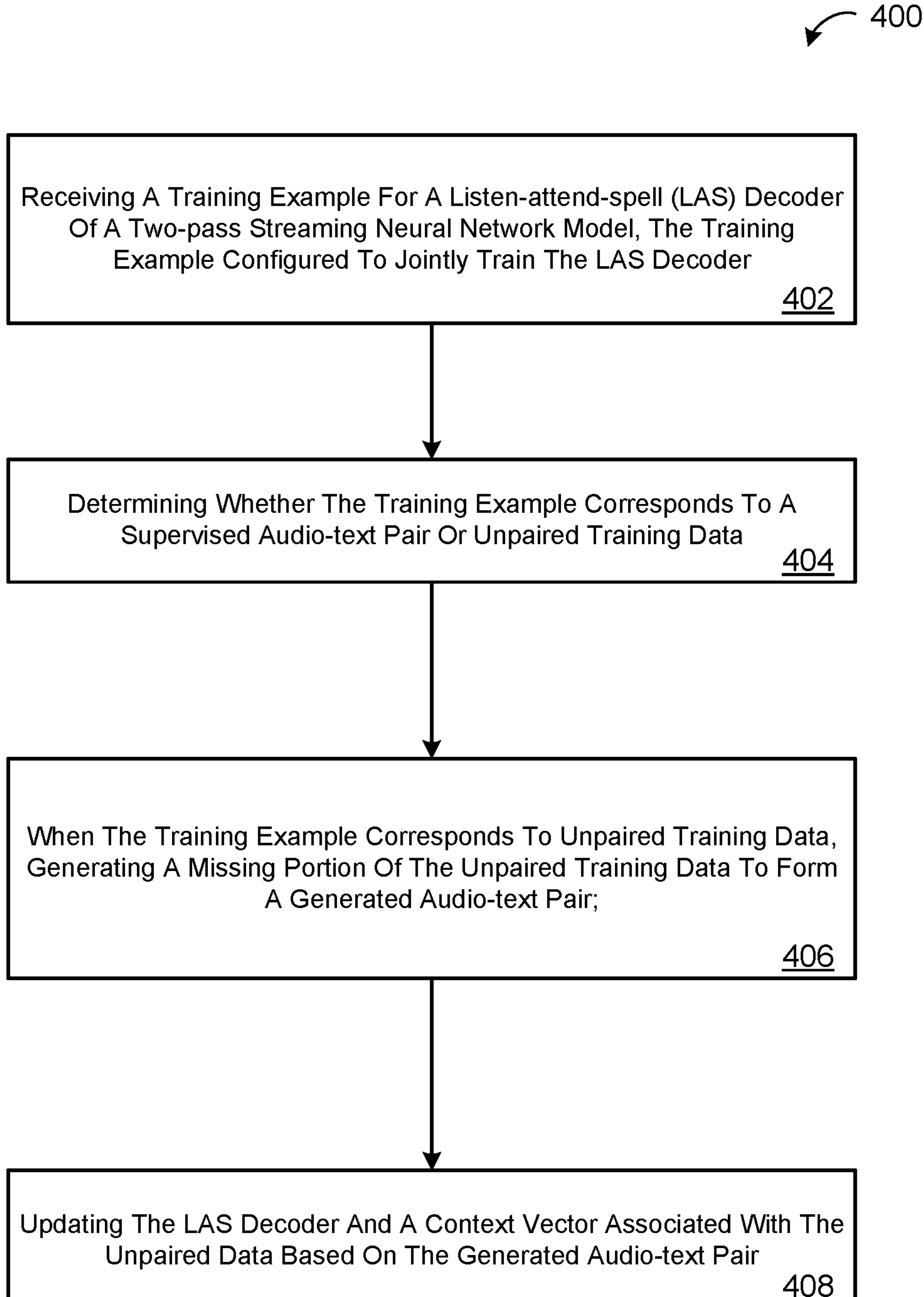
FIG. 4 is a flowchart of an example arrangement of operations for a method of implementing the two-pass architecture of FIG. 2B incorporating the joint acoustic and text model.

FIG. 4 is another flowchart of an example arrangement of operations for a method 400 of performing automated speech recognition (e.g., ASR). At operation 402, the method 400 receives a training example for a LAS decoder 230 of a two-pass streaming neural network model. Here, the training example is configured to train the LAS decoder 230. At operation 404, the method 400 determines whether the training example corresponds to a supervised audio-text pair or unpaired training data. When the training example corresponds to unpaired training data, at operation 406, the method 400 generates a missing portion of the unpaired training data to form a generated audio-text pair. At operation 408, the method 400 updates the LAS decoder 230 and a context vector c associated with the unpaired data based on the generated audio-text pair.

Figure 5:
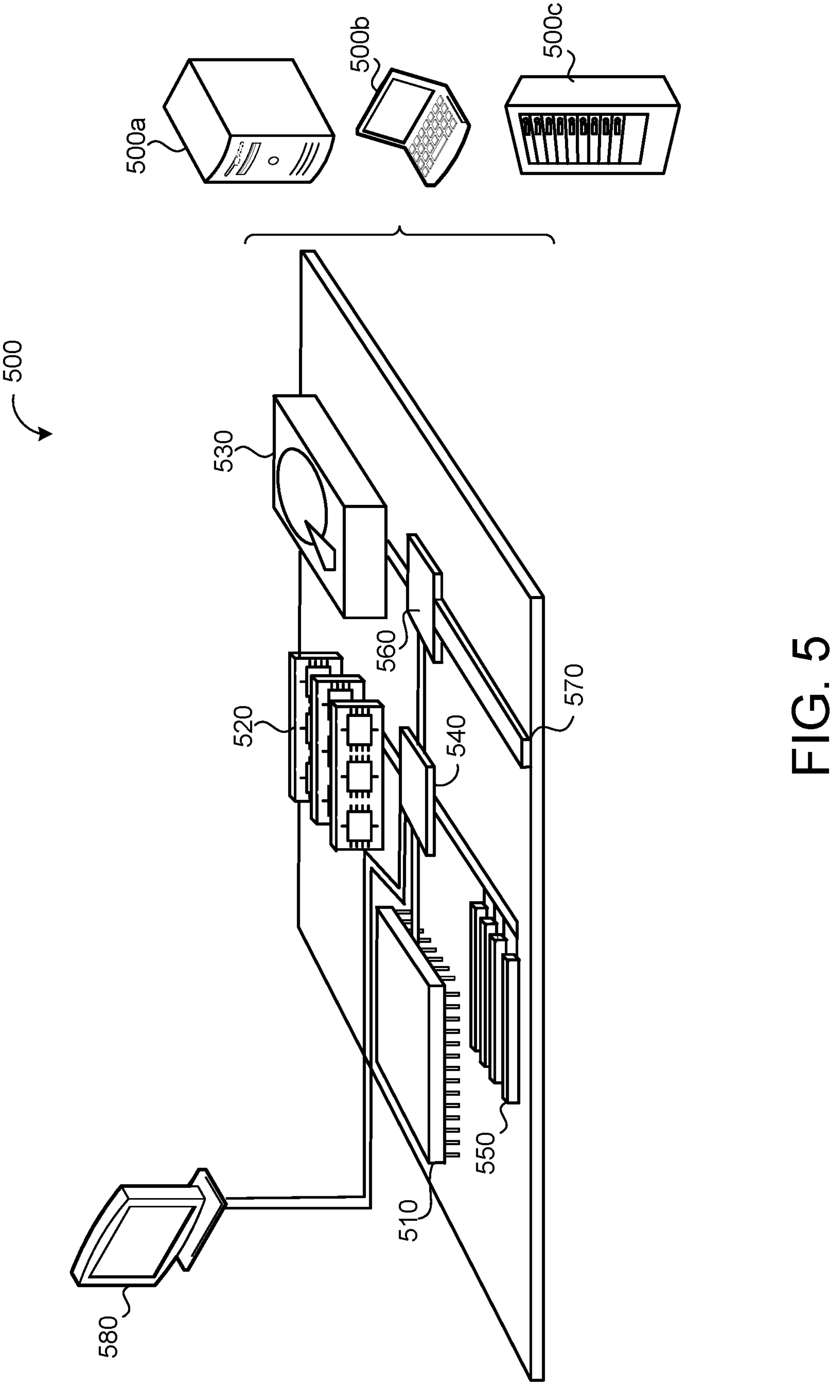
FIG. 5 is a schematic view of an example computing device that may be used to implement the systems and methods described herein.

FIG. 5 is schematic view of an example computing device 500 that may be used to implement the systems (e.g., the speech recognizer 200) and methods (e.g., the methods 300, 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 540, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface

540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:

receiving a sequence of acoustic frames characterizing an utterance;

encoding, using a shared encoder, each acoustic frame in the sequence of acoustic frames to generate a corresponding encoded acoustic frame;

generating, using a first-pass decoder, based on the encoded acoustic frames, streamed hypotheses;

at each output step of a plurality of output steps for a second-pass decoder:

determining, using a same attention mechanism, both:

an acoustic context vector that summarizes the encoded acoustic frames; and a linguistic context vector based on a sequence of decoded labels previously output by the second-pass decoder;

determining, using the acoustic context vector, as output from the second-pass decoder, an acoustic-based probability distribution over possible output labels;

determining, using the linguistic context vector, as output from the second-pass decoder, a text-based probability distribution over possible output labels; and interpolating the acoustic-based probability distribution over possible output labels and the text-based probability distribution over possible output labels, wherein the possible output labels in the acoustic-based probability distribution and the possible output labels in the text-based probability distribution comprise a same set subword units; and determining a transcription of the utterance based on the interpolating of the acoustic-based probability distribution over possible output labels and the text-based probability distribution over possible output labels at each of the plurality of output steps.

2. The method of claim 1, wherein determining the linguistic context vector based on the sequence of decoded labels previously output by the second-pass decoder ignores the encoded acoustic frames.

3. The method of claim 1, wherein determining the acoustic-based probability distribution over possible output labels using the acoustic context vector is further based on the sequence of decoded labels previously output by the second-pass decoder.

4. The method of claim 1, wherein the second-pass decoder operates in a beam search mode based on the streamed hypotheses generated by the first-pass decoder during a first pass.

5. The method of claim 1, wherein the operations further comprise:

processing, using the first-pass decoder, the encoded acoustic frames to generate a top-K list of speech recognition hypotheses for the utterance, each speech recognition hypotheses in the top-K list of speech recognition hypotheses corresponding to a candidate transcription of the utterance; and the second-pass decoder operations in a rescoring mode to rescore each speech recognition hypotheses in the top-K list of speech recognition hypotheses.

6. The method of claim 1, wherein the output labels in the acoustic-based probability distribution over possible output labels and the text-based probability distribution over possible output labels comprise wordpieces.

7. The method of claim 1, wherein the second-pass decoder comprises a listen-attend-spell (LAS) decoder.

8. The method of claim 1, wherein interpolating the acoustic-based probability distribution over possible output labels and the text-based probability distribution over possible output labels comprises using a mixing weight to interpolate the acoustic-based probability distribution over possible output labels and the text-based probability distribution over possible output labels so that the acoustic-based probability distribution over possible output labels are weighted differently than the text-based probability distribution over possible output labels.

9. The method of claim 1, wherein:

wherein the utterance characterized by the sequence of acoustic frames is captured in streaming audio by a user device; and the data processing hardware resides on the user device.

10. The method of claim 9, wherein the operations further comprise performing natural language processing on the transcription to identify an action for a digital assistant application to perform.

11. A system comprising:

data processing hardware; and memory hardware in communication with the data processing hardware, the memory hardware storing instructions that when executed on the data processing hardware cause the data processing hardware to perform operations comprising:

receiving a sequence of acoustic frames characterizing an utterance;

encoding, using a shared encoder, each acoustic frame in the sequence of acoustic frames to generate a corresponding encoded acoustic frame;

generating, using a first-pass decoder, based on the encoded acoustic frames, streamed hypotheses;

at each output step of a plurality of output steps for a second-pass decoder:

determining, using a same attention mechanism, both:

an acoustic context vector that summarizes the encoded acoustic frames; and a linguistic context vector based on a sequence of decoded labels previously output by the second-pass decoder;

determining, using the acoustic context vector, as output from the second-pass decoder, an acoustic-based probability distribution over possible output labels;

determining, using the linguistic context vector, as output from the second-pass decoder, a text-based probability distribution over possible output labels; and interpolating the acoustic-based probability distribution over possible output labels and the text-based probability distribution over possible output labels, wherein the possible output labels in the acoustic-based probability distribution and the possible output labels in the text-based probability distribution comprise a same set subword units; and determining a transcription of the utterance based on the interpolating of the acoustic-based probability distribution over possible output labels and the text-based probability distribution over possible output labels at each of the plurality of output steps.

12. The system of claim 11, wherein determining the linguistic context vector based on the sequence of decoded labels previously output by the second-pass decoder ignores the encoded acoustic frames.

13. The system of claim 11, wherein determining the acoustic-based probability distribution over possible output labels using the acoustic context vector is further based on the sequence of decoded labels previously output by the second-pass decoder.

14. The system of claim 11, wherein the second-pass decoder operates in a beam search mode based on the streamed hypotheses generated by the first-pass decoder during a first pass.

15. The system of claim 11, wherein the operations further comprise:

processing, using the first-pass decoder, the encoded acoustic frames to generate a top-K list of speech recognition hypotheses for the utterance, each speech recognition hypotheses in the top-K list of speech recognition hypotheses corresponding to a candidate transcription of the utterance; and the second-pass decoder operations in a rescoring mode to rescore each speech recognition hypotheses in the top-K list of speech recognition hypotheses.

16. The system of claim 11, wherein the output labels in the acoustic-based probability distribution over possible output labels and the text-based probability distribution over possible output labels comprise wordpieces.

17. The system of claim 11, wherein the second-pass decoder comprises a listen-attend-spell (LAS) decoder.

18. The system of claim 11, wherein interpolating the acoustic-based probability distribution over possible output labels and the text-based probability distribution over possible output labels comprises using a mixing weight to interpolate the acoustic-based probability distribution over possible output labels and the text-based probability distribution over possible output labels so that the acoustic-based probability distribution over possible output labels are weighted differently than the text-based probability distribution over possible output labels.

19. The system of claim 11, wherein:

wherein the utterance characterized by the sequence of acoustic frames is captured in streaming audio by a user device; and the data processing hardware resides on the user device.

20. The system of claim 19, wherein the operations further comprise performing natural language processing on the transcription to identify an action for a digital assistant application to perform.

* * * * *